United States Patent [19]

Boettcher, Jr. et al.

[11] 4,336,587

[45] Jun. 22, 1982

[54] HIGH EFFICIENCY TURN-OFF LOSS REDUCTION NETWORK WITH ACTIVE DISCHARGE OF STORAGE CAPACITOR

[76] Inventors: Charles W. Boettcher, Jr., R.D. 3 Box F-118, Cliffwood Rd., Chester, N.J. 07930; Robert E. Schroeder, 4 Ramar St., Flanders, N.J. 07836

[21] Appl. No.: 278,354

[22] Filed: Jun. 29, 1981

[51] Int. Cl.³ .......................................... H02M 7/537
[52] U.S. Cl. ...................................... 363/134; 363/24; 363/56
[58] Field of Search ................... 307/253, 254, 300; 331/113 R; 363/22–26, 131, 55, 133, 56, 134

[56] References Cited

U.S. PATENT DOCUMENTS

| | | | |
|---|---|---|---|
| 3,158,791 | 11/1964 | Deneen, Jr. et al. | |
| 4,015,185 | 3/1977 | Pollmeier | 363/133 |
| 4,167,776 | 9/1979 | Nygaard | 363/131 X |
| 4,276,588 | 6/1981 | McLyman et al. | 363/56 |

OTHER PUBLICATIONS

"Designing Non-Dissipative Current Snubbers for Switched Mode Converters", Eugene C. Whitcomb, Proceedings of the Powercon, May 1979, pp. B1-1-B-1-6.

*Primary Examiner*—William M. Shoop
*Attorney, Agent, or Firm*—A. G. Steinmetz

[57] ABSTRACT

A turn-off loss reduction network is applied to the power transistors of a double-ended inverter circuit to reduce power dissipation therein. A switched resonance discharge circuit is utilized to discharge the storage capacitor of the turn-off loss reduction network. Dissipation during discharge is eliminated by including an energy recovery circuit in the discharge network which is operative to return the energy to the input voltage source of the inverter. The gate discharge circuit includes a gated resonant discharge path with an inductive storage medium having a secondary winding or otherwise coupled to return the energy to the input voltage source.

At the beginning of the conduction cycle of the power switching transistor, a gate is enabled which allows the capacitor to discharge into the inductive storage medium. When the discharge current reaches its peak value, the gate is disabled, and the energy stored in the inductive medium is discharged to the source by flyback action.

8 Claims, 8 Drawing Figures

HIGH EFFICIENCY TURN-OFF LOSS REDUCTION NETWORK WITH ACTIVE DISCHARGE OF STORAGE CAPACITOR

BACKGROUND OF THE INVENTION

1. Field of the Invention

This invention relates to power inverter and converter circuits and to improving the switching efficiency of its power switching transistors. In particular, it relates to turn-off loss reduction networks to improve the switching efficiency of power switching transistors during a switching transition from conduction to nonconduction intervals.

2. Description of the Prior Art

Power inverter and converter circuits utilize power switching transistors, coupled to a voltage transformer, in order to invert a DC voltage to derive an AC voltage. For AC-to-DC converters, this AC voltage is rectified to produce DC again. During the turn-off transition of the switching transistor, as the collector current decreases from a high value to zero, collector-to-emitter voltage rises abruptly due to the energy stored in the leakage inductance in the primary circuit of the inverter, and a significant amount of power is dissipated within the power switching transistor. The occurrence of high collector-emitter voltage during the turn-off interval could give rise to a secondary breakdown in the transistor, which is analogous to an arcing condition within the transistor and precipitate its failure. This power dissipated in the transistor not only reduces overall inverter efficiency, but requires large heat exchange devices to remove the heat from the transistor in order to maintain the transistor temperature within safe limits.

Because of this danger of secondary breakdown to the power switching transistor in high power inverter circuits, and to reduce the power dissipated in the transistors, turn-off loss reduction networks are used to control the rate of voltage rise across the power switching transistor during the turn-off transition period. Most turn-off loss reduction networks utilize the principle that the voltage across a capacitor is proportional to the time integral of the current through the capacitor in order to limit the rate of rise of the collector-emitter voltage as the power switching transistor turns off.

A typical turn-off loss reduction network comprises a series-connected diode and a capacitor connected in parallel with the main conduction path of the power switching transistor. The capacitor in the turn-off loss reduction limits the rate of rise in the collector-emitter voltage during the transition from conduction to nonconduction, as it charges from near zero to the off-state collector-emitter voltage. During the next subsequent conduction interval of the power switching transistor, however, the capacitor is discharged to the low saturated collector-emitter voltage of the conducting power transistor.

Typical capacitor discharge circuits for a turn-off loss reduction network use a resistive discharge path. This circuit has the advantage of simplicity; however, the energy saved by the turn-off loss reduction network during the turn-off switching transition is lost in the resistive discharge path during the following conduction interval of the power transistor. This power loss can be significant in the case of high power inverter circuits and is dissipated as heat within the inverter equipment.

The power dissipation of the discharge path is intensified in push-pull or double-ended type inverter designs, since due to the auto transformer effect of the center tapped primary winding of an inverter power transformer, the capacitive charge and discharge cycle associated with the turn-off loss reduction network of each power switching transistor occurs twice during each cycle of operation of the inverter circuit.

It is important then that turn-off loss reduction circuitry utilized to improve efficiency of the switching of the power switching transistor of a high power inverter be operated to eliminate the aforedescribed double charge/discharge occurrence and further include a low loss discharge path to reduce power dissipation as much as possible during the discharge cycles of the capacitors included in the turn-off loss reduction network.

Two examples of turn-off loss reduction networks, using high efficiency discharge paths to reduce loss during the discharge of the capacitor, are disclosed in U.S. Pat. No. 4,015,185 issued to Werner Pollmeier on Mar. 29, 1977 and in an article entitled "Designing Non-Dissipative Current Snubbers For Switched Mode Converters" by Eugene C. Whitcomb published in the Proceedings of POWERCON 6 May 1979. The turn-off loss reduction networks disclosed therein utilize a nondissipative turn-off loss reduction network using resonant LC charging and discharging paths to control the network's capacitor charge. Steering diodes are utilized to couple the capacitor to supply current, at the turn-off of the switching transistor, to an output filter in order to replace current previously supplied thereto by the now turned-off switching transistor. These circuits, however, are limited by being completed dependent on resonant circuit action and are susceptible to premature partial discharge whenever the voltage across the transistor drops below the peak value attained. These circuits are both disclosed with reference to single-ended type inverter circuits. They are not effective in the double-ended inverter circuits, since the premature discharge phenomenon referred to above interferes with the desired operation.

SUMMARY OF THE INVENTION

Therefore in accord with the principles of the invention, a high efficiency capacitor discharge path for a turn-off loss reduction network included in a double-ended power inverter circuit eliminates premature discharge by utilizing a gated nondissipative discharge circuit path to discharge the capacitor of the turn-off loss reduction network and return the energy stored therein to the input voltage source.

Specifically, a resonant discharge path for the capacitor includes a primary winding coupled to a magnetic storage medium. At the beginning of the conduction interval of the power switching transistor, the gate is enabled to conduct discharge current to the primary winding whereby the discharge current energy is stored in the inductive storage medium. After a time delay which allows for complete discharge of the capacitor, the gate is disabled and the energy stored in the inductive medium is discharged into a secondary winding coupled to the input voltage source by a diode.

DETAILED DESCRIPTION

Figure 1:
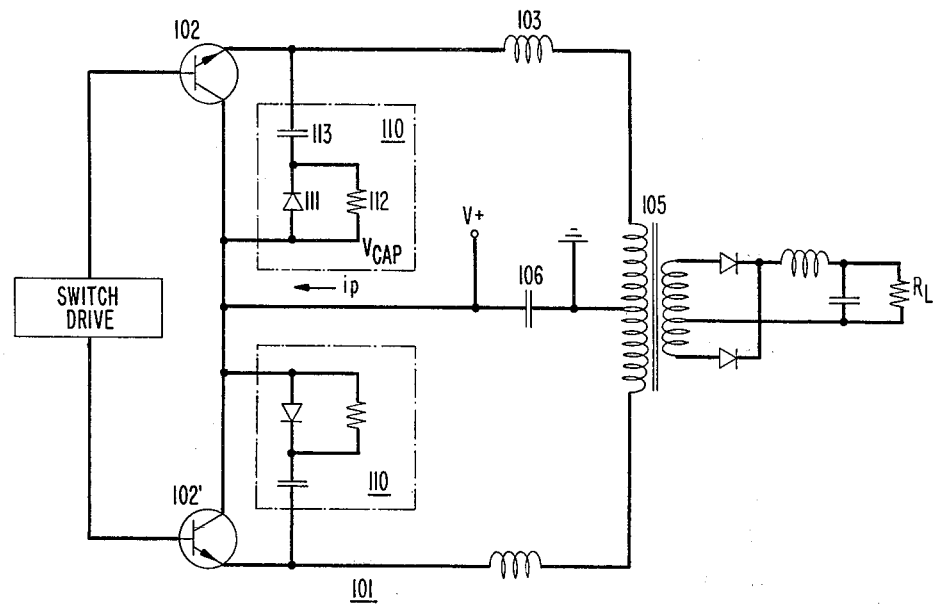
FIG. 1 is a schematic of a double-ended power inverter including a prior art turn-off loss reduction network as applied to the power switching transistors.

A prior art type turn-off loss reduction network 110 including a diode 111, resistor 112 and capacitor 113 is shown in FIG. 1 as applied to a double-ended power inverter circuit 101. This turn-off loss reduction network is operative to reduce energy dissipated in the power switching transistor 102 when it turns-off into the leakage inductive load 103 associated with the transformer 105 and power path wiring stray inductance. Such turn-off loss reduction networks are utilized in high power inverter circuits to reduce the power dissipated within the transistor and avoid secondary breakdown failure in the power switching transistor due to the high instantaneous power loss during the turn-off transition period as described above. Identical turn-off loss reduction networks 110 and 110' are shunted across each of the power switching transistors 102 and 102'. Each turn-off loss reduction network operates to reduce power dissipation during turn-off of the power transistor it shunts. It's performance may be explained by describing the operation of one network 110 during a single cycle of operation of the inverter.

During its conduction interval the power switching transistor 102 is saturated. During this saturated conduction interval, the capacitor 113 of the turn-off loss reduction network 110 is discharged to a voltage level approximately equilizing the collector-to-emitter saturation voltage of the power switching transistor. As the power switching transistor 102 begins its turn-off transition, the load current which had been flowing therethrough is maintained by the stored energy in the leakage inductance 103. Capacitor 113 of turn-off loss reduction network 110, provides a path for this inductive load current shunting the power switching transistor 102 and its voltage inertia characteristics limit the rate of rise of the collector-to-emitter voltage of the switching transistor 102. During the turn-off transition, capacitor 113 is charging, via the diode 111 while controlling the rate of rise of the collector-to-emitter voltage. This action in controlling the rise of collector-emitter voltage significantly reduces the instantaneous turn-off power loss because a substantially lower voltage is maintained across the collector-to-emitter electrodes of transistor 102 during this turn-off transition period in a double-ended inverter. The capacitor 113, however, finally charges up to twice the DC input voltage supplied to the inverter input filter capacitor 106. This voltage on the capacitor 113 is discharged during the next conduction interval of transistor 102 through the discharge resistor 112.

Figure 2:
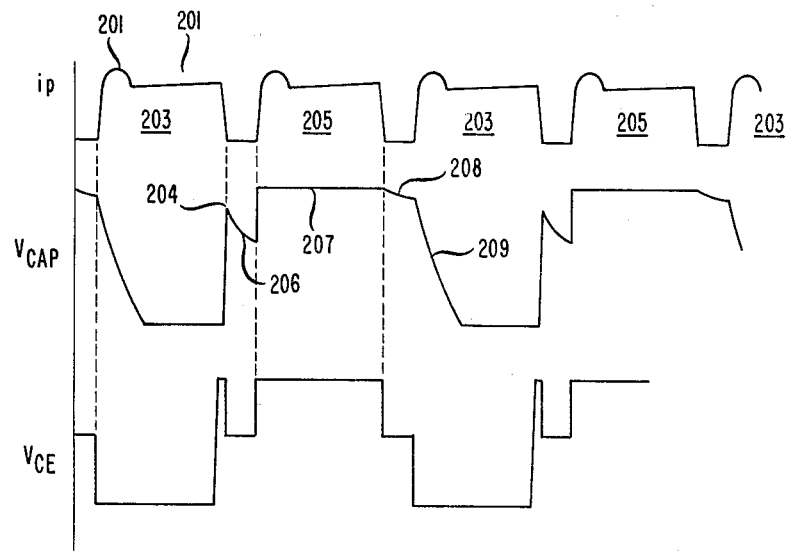
FIG. 2 shows typical transformer primary current and network capacitor voltage and transistor collector-emitter voltage waveforms of the circuit of FIG. 1.

It is readily apparent that significant amounts of power are dissipated in the resistive discharge path 112 which is dissipated as heat within the inverter. The power dissipation problem is further complicated by the fact that in double-ended inverter circuits, a second charge/discharge cycle of the capacitor occurs each cycle. This can be readily seen by examination of the current and voltage waveforms shown in FIG. 2, wherein the transformer primary current $i_p$ is shown as comprising an initial peak value 201 due to initial ringing at turn-on followed by an increasing ramp 202 which is typical of inductively loaded circuits. The individual current pulses designated 203 represent the current flow through transistor 102 and network 110. Voltage waveform $V_C$ in FIG. 2 shows the voltage across capacitor 113 associated with the switching transistor 102. The collector-emitter voltage of transistor 102 is shown by waveform $V_{CE}$. As is apparent from the waveforms, the voltage of capacitor 113 rises to a first peak value 204 at the end of current pulse 203. This peak value 204 is equal to the battery voltage $V+$ at capacitor 106 plus an overshoot due to the energy stored in the transformer leakage inductance 103. This peak is immediately followed by a steep discharge trajectory 206 as the capacitor discharges to $V+$ through resistor 112. This discharge trajectory 206 continues until the opposite transistor 102' begins to conduct current pulse 205. At this point, voltage of capacitor 113 rises to level 207 which is equal to twice the battery voltage $V+$. When transistor 102' ceases to conduct, a second discharge trajectory 208 occurs as capacitor 113 discharges toward the battery voltage $V+$ through resistor 112. As soon as transistor 102 fully conducts, as shown by the subsequent current pulse 203, capacitor 113 is discharged through transistor 102 and resistor 112 following discharge trajectory 209, which has a final value of the saturated collector-to-emitter voltage drop of transistor 102.

This double charge/discharge phenomenon occurs because of the fact that in push-pull or double-ended inverter circuits, the collector-to-emitter voltage across a nonconducting power switching transistor changes in value when its opposite power switching transistor begins to conduct. This is due to auto transformer coupling of the input voltage through the primary winding of the inverter's transformer. As indicated above, the capacitor 113 starts discharging through resistor 112 soon after transistor 102 ceases conduction when the collector-emitter voltage drops from its peak to a value equal to the input source. This discharge is interrupted when transistor 102' starts conduction due to this auto transformer effect, and capacitor 113 is recharged to a new voltage level equaling twice the input voltage. This added voltage must be again discharged through the discharge resistor 111 in the discharge path. Hence, charge and discharge occurs twice in each turn-off network for each cycle of operation, intensifying the energy lost in the discharge process of the turn-off loss reduction networks.

Figure 3:
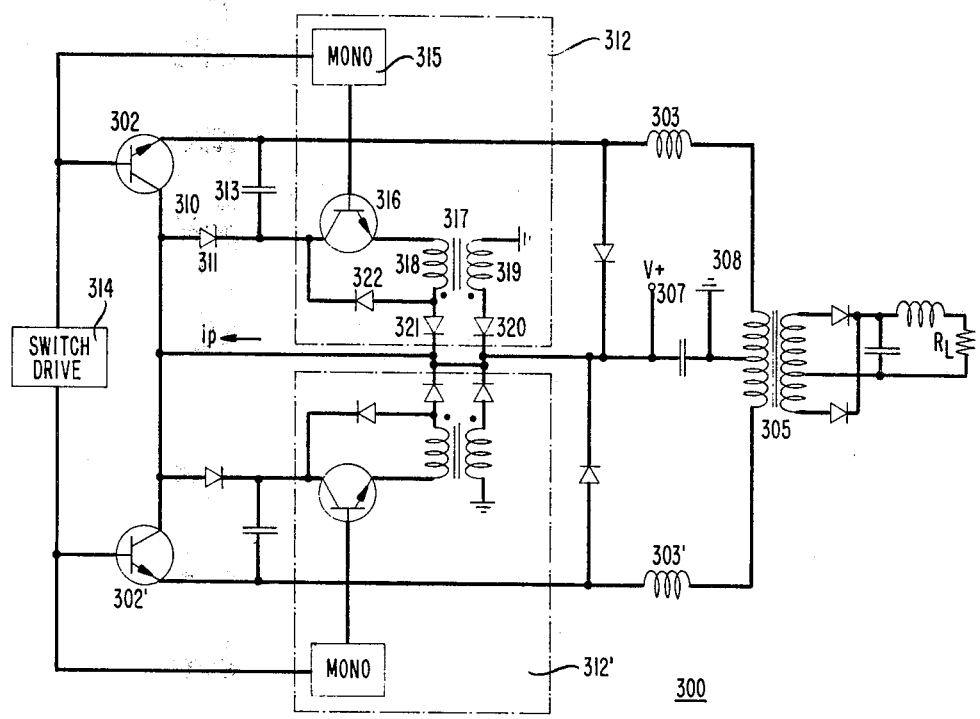
FIG. 3 discloses a double-ended power inverter including a turn-off loss reduction network embodying the principles of the invention applied to the power switching transistors.

A power inverter circuit including a turn-off loss reduction network embodying the principles of the invention is shown in FIG. 3. Power inverter 300 includes two power switching transistors 302 and 302', each inductively loaded by the leakage inductance 303 and 303' of the power transformer 305. Since both turn-off loss reduction networks 310 and 310' operate identically, we need only describe the turn-off loss reduction network 310 associated with the power switching transistor 302. Turn-off loss reduction network 310 includes a series-connected diode 311 and capacitor 313, coupled across the collector-emitter path of transistor 302. Capacitor 313 is discharged through a resonant switching discharge circuit 312. This discharge 312 comprises a series circuit connection including a switching transistor 316, a primary winding 318 of transformer 317 and a diode 321, and interacts with the power switching transistor 302. A secondary winding 319 of the transformer 317 is coupled via diode 320, to the positive terminal 307 of the input voltage source V+. Switching transistor 316 is driven into saturation by a monostable circuit 315, which is triggered in synchronism with the switching drive circuit 314 output which drives the power transistor 302 into conduction.

This switched resonant discharge circuit discharges energy stored on the capacitor 313 and resupplies it to the DC voltage source at input terminal 307. By transferring the energy accumulated on the capacitor 313 to the source, the energy previously lost in the circuit shown in FIG. 1 in discharging the capacitor is not dissipated but is recoverable by the input energy source. The switched resonant discharge circuit 318 also, as will be apparent, advantageously prevents the double charge/discharge phenomenon, which was discussed hereinabove with reference to the prior art turn-off loss reduction network.

Turn-off loss reduction network 310 operates in the same manner as was described above with reference to the prior art turn-off loss reduction network during the turn-off transition interval. As the power transistor 302 is biased nonconducting, capacitor 313 acts as a current sink and slows the voltage rise across the collector-emitter path of power transistor 302. Capacitor 313 is charged at the end of the turn-off transition to a value equal to nearly twice the DC input voltage. After the start of the conduction interval for power transistor 302', capacitor 313 is charged to twice the DC input voltage. This energy stored on the capacitor 313 must be discharged when power transistor 302 is biased conducting. In the prior art circuit in FIG. 1, this energy was discharged through a resistive dissipative path. In the circuit in FIG. 3, this energy is discharged through the switched resonant discharge network 312. The current flowing through the power transistor 302 and network 310 is shown by the current pulse of $i_p$ 403 in FIG. 4. The alternate current pulses 405 represent current pulses flowing through the power transistor 302' and network 310'. As soon as the power transistor 302 is biased into its conducting state by the switching drive 314, the monostable circuit 315 is synchronously triggered. The output of the monostable circuit 315 biases the switching transistor 316 into a saturated conduction state. This permits recharge current to flow in the circuit consisting of capacitor 313, the primary winding 318 of transformer 317, diode 321, and power transistor 302.

Figure 4:
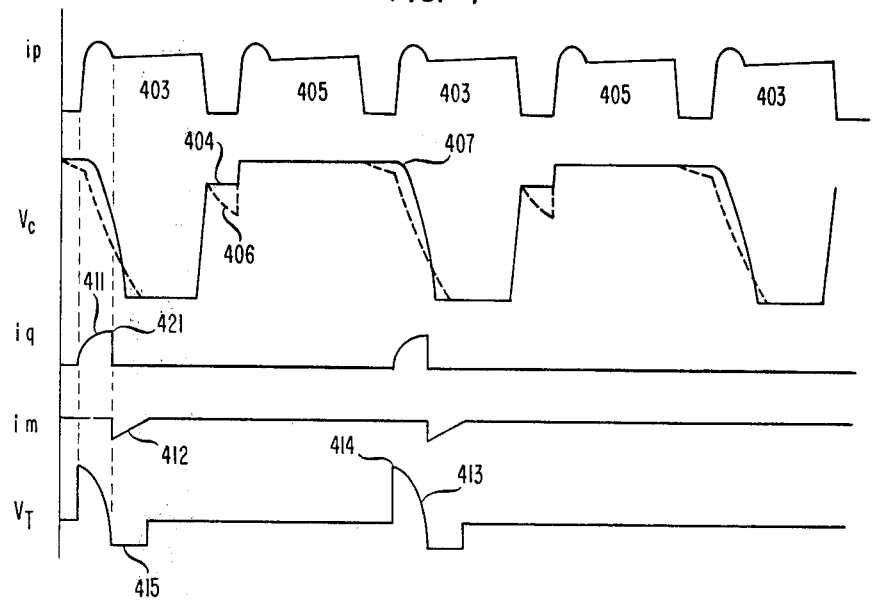
FIG. 4 discloses the current and voltage waveforms of a power switching transistor and the turn-off loss reduction network of FIG. 3.

This initial current flow is shown by the quarter sinusoidal wave 411 of $i_q$ in FIG. 4. Since the transistor 316 was cut off until power transistor 302 was biased conducting, no premature discharge occurs as was the case for the resistor discharge circuit which would have the discharge trajectory shown by dotted line 406. Instead, the trajectory remained flat as per curve portion 404. Capacitor 313 charges the rest of the way to twice the input voltage source when power transistor 302' begins to conduct. Capacitor 313's discharge then begins at point 407 at the beginning of conduction of power transistor 302. The sinusoidal current waveform 411 is determined by the values of the capacitor 313 and the inductance presented by the primary winding 318. This sinusoidal current 411 flows through the primary winding 318 until the capacitor 313 has discharged and diode 322 begins to conduct, at which time the current has reached its peak value 421. The monostable circuit 315 is properly timed to keep transistor 316 conducting until this point 421 is reached. Hence the period of the monostable circuit 315 is slightly longer than one quarter the period of the current sinusoid determined by the values of the capacitor 313 and the inductance of the primary winding 318. The current circulates in transistor 316, winding 318 and diode 322 until the monostable circuit 315 switches, and the switching transistor 316 is cut off terminating the current flow $i_q$. At this point 421, capacitor 313 is totally discharged and the energy has been magnetically stored in the core of the transformer 317. As soon as the switching transistor 316 is cut off, the voltage polarity of the primary winding 318 and of the secondary winding 319 instantly reverse and a current $i_m$ flows in the secondary winding and diode 320, as shown by ramp current waveform 412 in FIG. 4. This current waveform discharges the stored energy into the input voltage source between terminal 307 and 308. The voltage across the primary winding, during this store and discharge action, is shown by waveform $V_T$ where it is seen at the instant the transistor 316 is biased into its conducting state, the voltage of the capacitor 313 is instantly impressed across the primary winding 318 as shown by waveform 414. When the transistor 316 is biased nonconducting, a negative voltage pulse 415 appears across the primary and secondary winding equal to the input source voltage for the case of equal turns on windings 318 and 319. The reverse voltage 415 forward biases diode 320, thereby allowing the energy in the secondary winding 319 to discharge into the input voltage source and clamping the voltage on winding 319 to the input voltage V+. The areas of waveform 413 above zero and waveform 415 below zero are equal to each other.

It is readily apparent from the foregoing, that by substituting a switching resonant discharge circuit for the resistive discharge shown in FIG. 1, that the capacitor discharge is essentially lossless and that the double-discharge phenomenon, discussed hereinabove is eliminated. With the switching resonant discharge circuit, the capacitor 313 can discharge only when the transistor 302 starts to conduct and since the discharge path is closed prior to that event, no premature discharge of the capacitor is permitted. Diode 322 which shunts the series connection of primary winding 318 and switching transition is added to provide a circulatory current path that is operative to conduct discharge current upon high efficiency if the discharge current of capacitor 313 lasts longer than a one quarter of a cycle.

Figure 5:
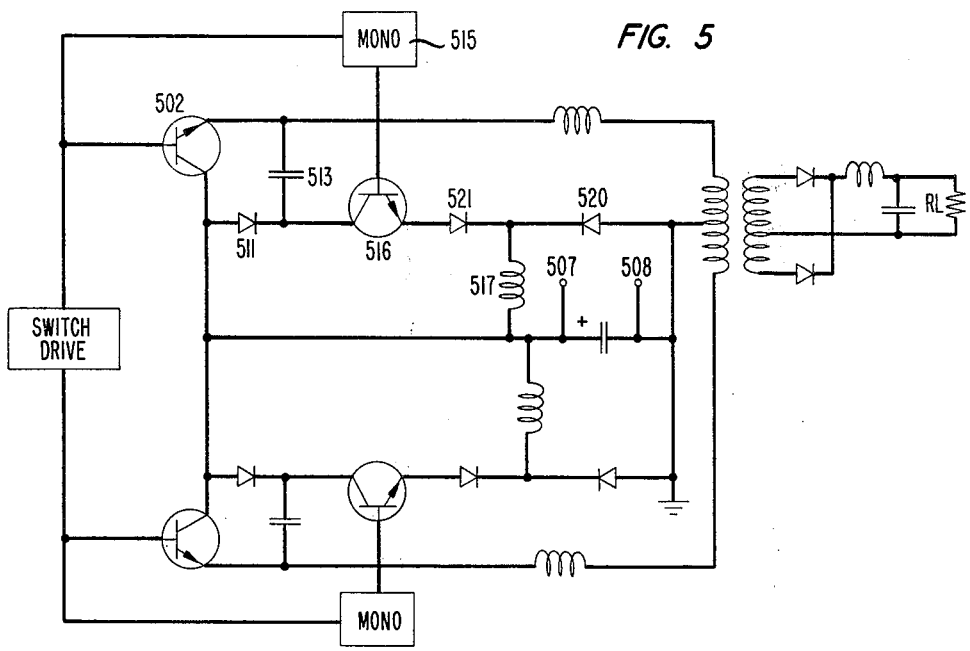
FIGS. 5, 6, 7 and 8 are all schematics of double-ended power inverters including alternate embodiments of turn-off loss reduction networks embodying the principles of the invention and applied to the power switching transistors of double-ended power inverter circuits.

A different topology for a resonant discharge circuit using a switch and embodying the principles of the invention is shown in FIG. 5. The discharge circuit shown in FIG. 5 comprises a switching transistor 516, a diode 521, and an inductor 517, all connected in series and coupling the capacitor 513 of the turn-off loss reduction network to the positive terminal 507 of the input voltage source. This particular topology eliminates the energy storage transformer arrangement having primary and secondary windings and substitutes a simple inductor 517 therefor. The operation is similar to that described with reference to the circuit of FIG. 3. When the switch drive biases the power transistor 502 into conduction, the monostable circuit 515 biases the switching transistor 516 into its conduction state. Conducting transistor 516 transfers the energy stored in capacitor 513 into the inductor core of inductor 517 during one quarter of a cycle with the same current waveform disclosed above with reference to FIG. 3. At the peak value or the one quarter point of the sine wave, as determined by the frequency characteristics of the components of the discharge path, transistor 516 is biased nonconducting, and the voltage across the inductor winding 517 reverses and a path is established to discharge the energy stored in the inductor 517 through a closed circuit loop comprising diode 520, inductor 517 and the positive and negative input terminals 507 and 508 of the input DC voltage source.

Figure 6:
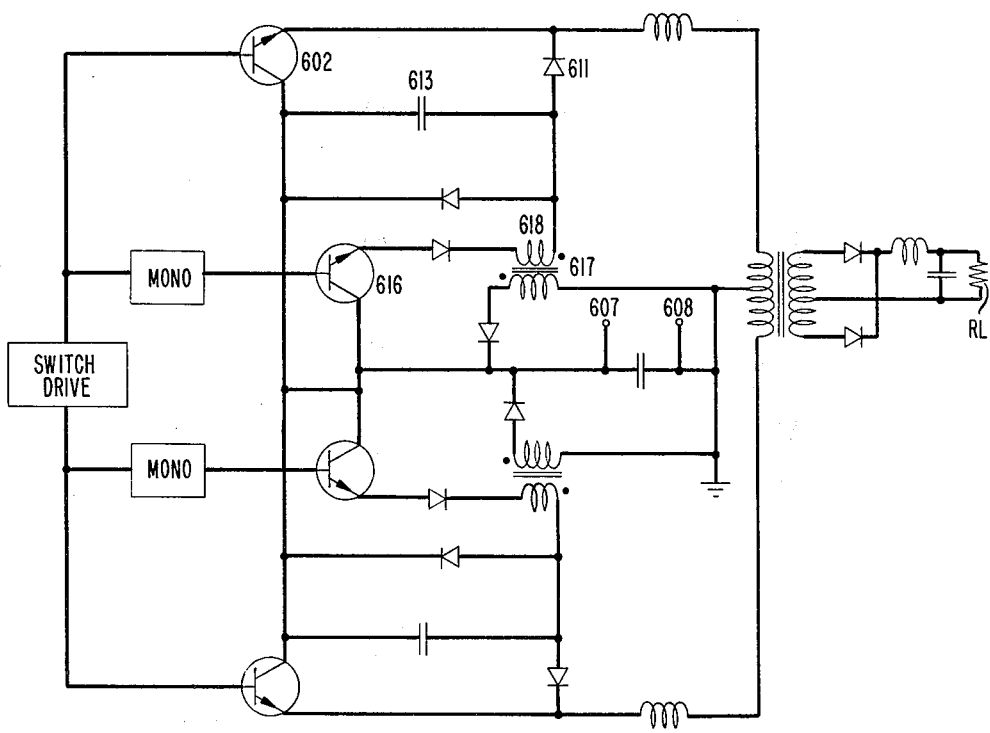

Another variation of a switching resonant discharge circuit embodying the principles of the invention is shown in FIG. 6. This circuit, too, is similar in operation to that of the circuit disclosed in FIG. 3. When the switching transistor 616 is biased conducting, the capacitor 613 is discharged into a circuit discharge loop including primary winding 618 of transformer 617. This discharge energy is stored in the core of the transformer 617. As soon as the switching transistor 616 is biased nonconducting, this energy stored in the core of the transformer 617 is discharged into the source terminals 607 and 608. This configuration has the advantage that the switching transistor 602 does not have to conduct the recharge pulse of current in addition to the load current.

Figure 7:
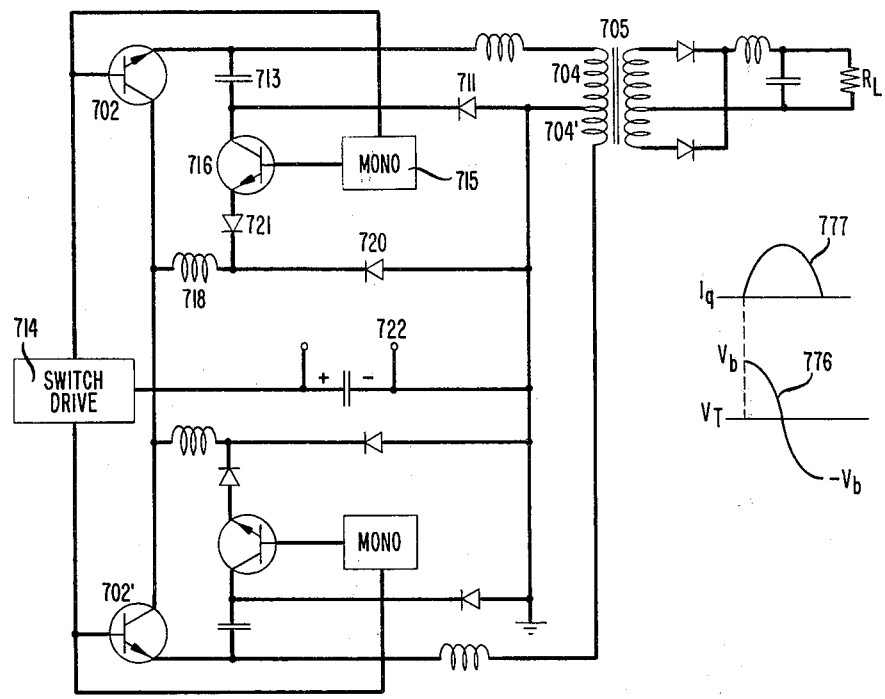

A somewhat different topology for a turn-off loss reduction network embodying the principles of the invention is shown in the power inverter disclosed in FIG. 7. This turn-off loss reduction network associated with power transistor 702 comprises a series-connected diode 711 and a capacitor 713, wherein the series connection of the capacitor 713 and diode 711 is directly connected across one-half of the center tapped primary winding 704 of the inverter's power transformer 705. The second turn-off loss reduction network associated with power transistor 702' is shunted across primary winding 704'. Since these turn-off loss reduction networks are shunted across the primary winding segments 704 and 704', the capacitor 713 is charged to the input voltage level and not twice that level, as in the previous networks discussed above. A switched resonant discharge network including transistor switch 716 is utilized to enable the discharge path which includes an energy storage inductor 718 and diodes 721 and 720. This particular discharge network embodies the same principles described with reference to the previous circuits above; however, the current in voltage waveforms involving an operation differs somewhat.

In operation, the switching transistor 716 is connected in series with the diode 721 and an inductor 718. The junction of the diode 721 and inductor 718 is coupled by diode 720 to terminal 722 of the input source. Monostable circuit 715 biases switching transistor 716 into its conducting state at the same time the power transistor 702 is biased into conduction by the switch drive 714. Capacitor 713 discharges through switching transistor 716, diode 721, inductor 718 and power transistor 702. Instead of turning off switching transistor 716 at the peak of the sinsusoidal current waveform 777 as above, the monostable circuit 715 is timed so that the transistor 716 conducts for a full half cycle of the sinsusoidal discharge current waveform 777 shown in FIG. 7. The resulting voltage waveform across the capacitor 713 is shown by waveform 776 and comprises a cosine function which goes from plus the value of the input source voltage $V_b$ to minus that value $-V_b$ which is attained when the discharge current equals zero. Hence the switching transistor 716 is turned off when it has zero current going through it thereby further reducing energy loss in the discharge circuit. If the power transistor 702 turns off before the current reaches zero, transistor 716 is also turned off and the reverse voltage induced in winding 718 forward biases diode 720. The remaining energy which has been stored in the inductor 718 is now delivered to the source, via the now forward biased diode 720.

Figure 8:
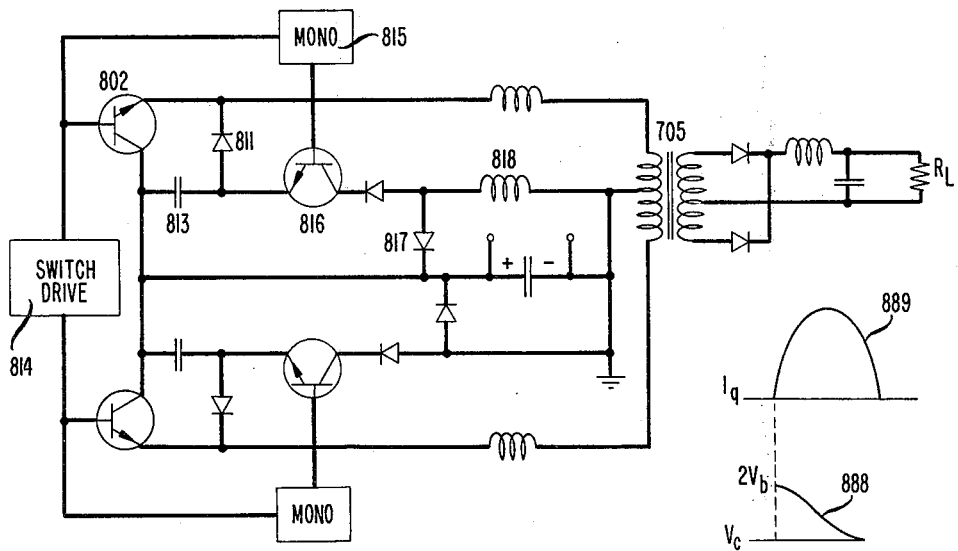

A discharge circuit for the turn-off loss reduction network shown in FIG. 8 includes the input source as part of the series discharge path and so returns energy to the source during the resonant discharge of the capacitor. In this turn-off loss reduction network, the capacitor 813 and diode 811 are connected in series and shunted across the collector-emitter path of the power transistor 802. Switching transistor 816 is biased conducting when the switch drive 814 triggers the monostable circuit 815 while biasing the power transistor 802 into conduction. The energy stored on the capacitor 813 is delivered back to the source by the resonant discharge of the capacitor 813 while the switching transistor 816 is conducting. Because the turn-off loss reduction network is shunted directly across the collector-emitter path of power transistor 802, capacitor 813 as shown by voltage waveform 888 has charged up to twice the source voltage $2 V_b$. Hence the discharge of the capacitor, as shown by waveform 888 accompanying the half sinusoid current discharge pulse 889, goes from a value of plus twice the source voltage $2 V_b$ to zero. Again transistor 816 is turned off when it has zero current through it as long as the power transistor 802 conducts long enough for the complete discharge of the capacitor. If transistor 802 turns off early, transistor 816 is also turned off and the remaining energy stored in inductor 818 would be returned to the input source through diode 817.

Many other varied turn-off loss reduction networks and switched resonant discharge paths applied to alternate inverter or converter power circuit topologies utilizing the principles disclosed herein, will suggest themselves to those skilled in the art without departing from the spirit and scope of the present invention.

What is claimed is:

1. In combination; an inverter circuit including first and second high efficiency turn-off loss reduction networks each coupled to reduce turn-off loss in first and second power switching transistors coupling a DC voltage source to a power transformer, each of the first and second turn-off loss reduction networks comprising;

a charge storage capacitor coupled to a main conduction path electrode of a power switching transistor of the inverter, a charging path coupled for providing an alternate path for current flow from the power transformer when the power transistor is being biased from conduction to nonconduction, and a resonant discharge path coupled to transfer energy stored in the charge storage capacitor into the DC voltage source when the power transistor is biased conducting, including a gating transistor switch biased into conduction when the power transistor is biased conducting and coupled to deliver energy to an inductive storage medium, timing circuitry to bias the gating transistor switch nonconducting at a predetermined time interval, and a flyback discharge path coupling the inductive storage medium to the DC voltage source in order to discharge energy thereto when the gating transistor switch is biased nonconducting.

2. An inverter circuit as defined in claim 1 wherein the timing circuitry is synchronized with drive circuitry for the power transistor and has a timing period to drive the gating transistor switch conducting for a minimum interval equal to one quarter of a resonant period defined by reactive values of the charge storage capacitor and the inductive storage medium.

3. An inverter circuit as defined in claim 2 wherein the charging path includes
a diode connected in series circuit with the charge storage capacitor and the series circuit shunted across a main conduction path of the power switching transistor, the resonant discharge path coupled to a common junction of the diode and charge storage capacitor and the inductive storage medium comprising
a transformer having a primary winding coupled to the gating transistor switch and the flyback discharge path including a secondary winding of the transformer and a second diode connected in series connection and coupled to the DC voltage source.

4. An inverter circuit as defined in claim 1 wherein the timing circuitry is synchronized with drive circuitry for the power transistor and has a timing period to drive the gating transistor switch conducting for a minimum interval equal to one half of a resonant period defined by reactive values of the charge storage capacitor and the inductive storage medium.

5. An inverter circuit as defined in claim 4 wherein the charging path includes
a diode connected in series circuit with the charge storage capacitor and the series circuit being shunted across a primary winding of the power transformer, the resonant discharge path coupled to a common junction of the diode and the charge storage capacitor and the inductive storage medium, a coil intercoupling the gating transistor switch to an input terminal to which the DC voltage source is connected.

6. An inverter circuit comprising;
input means to accept a voltage source,
output means,
at least a switching transistor coupling the input means to the output means,
a turn-off loss reduction network comprising; a charge storage capacitor in a series circuit shunting the switching transistor,
a discharge network to discharge the capacitor when the switching transistor is biased from nonconduction into conduction comprising;
an energy storage inductor including an input winding and an output winding,
a gating transistor coupling the capacitor to the input winding, drive means synchronized to bias the gating transistor into conduction when the switching transistor is biased into conduction, for an interval sufficient to discharge the capacitor into the inductor, and a discharge diode coupling the output winding to the input means and oriented to discharge energy stored in the inductor into the voltage source when the gating transistor is biased nonconducting.

7. An inverter circuit as defined in claim 6 wherein said drive means comprises;
a monostable circuit having a timed state equal to a one quarter resonant sinusoidal period defined by the reactive values of the charge storage capacitor and the energy storage inductor, whereby the one quarter resonant sinusoidal period is sufficient to completely discharge the capacitor.

8. An inverter circuit as defined in claim 6 wherein a magnetizing path diode is shunted across a series connection including the gating transistor and the input winding.

* * * * *

UNITED STATES PATENT AND TRADEMARK OFFICE
CERTIFICATE OF CORRECTION

PATENT NO. : 4,336,587
DATED : June 22, 1982
INVENTOR(S) : Charles W. Boettcher, Jr. and Robert E. Schroeder It is certified that error appears in the above—identified patent and that said Letters Patent is hereby corrected as shown below:

On the Title page after "Inventor" insert
-- [73] Assignee: Bell Telephone Laboratories, Incorporated, Murray Hill, N.J. --.

Column 2, line 33, "completed" should read --completely--.

Column 3, line 36, "It's" should read --Its--; line 43, "equilizing" should read --equalizing--.

Column 5, line 3, after "discharge" insert --circuit--.

Column 7, line 63, "sinsusoidal" should read --sinusoidal--, line 66, "sinsusoidal" should read --sinusoidal--.

Signed and Sealed this

Twelfth Day of April 1983

[SEAL]

Attest:

GERALD J. MOSSINGHOFF

*Attesting Officer*  *Commissioner of Patents and Trademarks*